United States Patent [19]

Jenney

[11] Patent Number: 6,163,813

[45] Date of Patent: *Dec. 19, 2000

[54] PATTERN FOR INSTANTIATING OBJECTS OF UNKNOWN TYPE IN OBJECT-ORIENTED APPLICATIONS

[75] Inventor: Eric Howland Jenney, Rochester, Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/474,837

[22] Filed: Jun. 7, 1995

[51] Int. Cl.$^7$ ...................................................... G06F 9/00
[52] U.S. Cl. ............................................................ 709/315
[58] Field of Search ....................................... 395/600, 650, 395/700, 680, 683; 709/300, 307, 310, 315, 316

[56] References Cited

U.S. PATENT DOCUMENTS 5,437,025   7/1995   Bale et al. ................................ 707/103

FOREIGN PATENT DOCUMENTS

0575073A2  12/1993   European Pat. Off. .......... G06F 9/44
575073     12/1993   European Pat. Off. . .

OTHER PUBLICATIONS

IBM Technical Disclosure Bulletin, vol. 38, No. 8, Aug. 1995, Armonk, NY, pp. 623–624, XP000534658, "Independent Class/Application Relationship in OO Environment."

IBM Technical Disclosure Bulletin, vol. 33, No. 8, Jan. 1991, Armonk, NY, pp. 179–180, XP000106920, "Recording Virtual Function Table Offsets in External Variables."

IBM Technical Disclosure Bulletin, vol. 35, No. 4b, Sep. 1992, Armonk, NY, pp. 224–226, XP000313917, "Version Independence for Object–Oriented Programming Systems."

Gibbs, Simon Class Management for Software Communities, Tsichritzis, Dennis, Casais, Eduardo, Communications of ACM, v.33, p 90 (14), Sep. 1990.

Gamma et al., Design Patterns: Elements of Reusable Object Oriented Software, Addison–Wesley, p. 65–73, 259–273, 369–377, 1994.

E. Gamma et al, "Design Pattern: Elements of Resuable Object Oriented Software", pp. 1–31 & 81–136, 1994.

*Primary Examiner*—Alvin E. Oberley
*Assistant Examiner*—St. John Courtenay, III
*Attorney, Agent, or Firm*—Martin & Associates, L.L.C.; Derek P. Martin

[57] ABSTRACT

An intelligent creator design pattern for instantiating a new application subclass of an application base class without revising existing application code in an object-oriented programming system. The intelligent creator design pattern of this invention specifies a base class to be inherited by an intelligent creator subclass added to an existing application to instantiate a new application subclass responsive to recognition of predetermined application input data without modification to the remainder of the application code. A dynamic list object that includes methods for autonomously updating a list of references to all intelligent creator subclasses eliminates knowledge of specific creator subclasses from the application. The dynamic list object code need not be updated when adding creator subclasses because the list object is self-updating responsive to the recognition methods of each new creator subclass added to the application. The recognition capacity provided in each intelligent creator subclass also eliminates all knowledge of specific application subclasses from the application.

14 Claims, 7 Drawing Sheets

PATTERN FOR INSTANTIATING OBJECTS OF UNKNOWN TYPE IN OBJECT-ORIENTED APPLICATIONS

BACKGROUND OF THE INVENTION

1. Field of the Invention

This invention relates generally to object-oriented design patterns for creating reusable metaclass types and specifically to an intelligent creator class for instantiating polymorphic subclasses of a metaclass that are unknown to the object-oriented application.

2. Description of the Related Art

Object-oriented technology employs an "object model" encompassing the well-known principles of abstraction, encapsulation, modularity, hierarchy, typing, concurrency, and persistence. Although none of these principles is by itself new, all of these elements are brought together synergistically to make up the "object model" underlying object-oriented technology. For a fundamental treatment of object-oriented analysis and design, reference is made to Grady Booch, *Object-Oriented Analysis and Design with Applications*, 2nd ed., The Benjamin/Cummings Publishing Co., Redwood City, Calif., 1994.

According to Booch, "abstraction" denotes the essential characteristics of an object that distinguishes it from all other kinds of objects, thereby providing crisply-defined conceptual boundaries relative to a viewer perspective. The abstraction property delivers "reusability" by means of encapsulation or information-hiding. Encapsulation is the process of compartmentalizing the elements of an abstraction that constitute its structure and behavior, serving to separate the contractual interface of an abstraction and its implementation by declaring publicly the specification of their behavior through a set of attributes and operations while keeping private to the object all implementing data structures and methods. Object types or classes are similar to data types and entity types with encapsulated methods or procedures. Data and methods are encapsulated and hidden by objects, which constitute concrete "instances" of a class. The terms "object" and "instance" are used interchangeably in the art. "Hierarchy" is a ranking or ordering of abstractions. "Inheritance" is a relationship among classes, wherein one class shares the structure or behavior defined in one or more other classes. Subclasses inherit attributes and methods from their superclasses and may add others of their own or override those inherited. In many object-oriented programming languages, "instances" inherit all and only the properties of their respective "classes." Inheritance defines an "is-a" hierarchy among classes in which a subclass inherits from one or more generalized superclasses; a subclass typically specializes its superclasses by augmenting or redefining their existing structure and behavior. A "metaclass" is a class of classes, instances of which are themselves classes.

An "abstract" class has no "instances" because it is written in the expectation that its concrete subclasses will add to its structure and behavior, typically by implementing its abstract operations. An abstract operation is declared but not implemented by an abstract class. A "base class" is the most generalized class in a class structure and may, in some situations, define the ultimate superclass of all classes.

"Typing" is the enforcement of the class of an object so that objects of different types may not be interchanged or may be interchanged only in very restricted ways. An object "type" defines a domain of allowable values that the object may possess and the set of operations that may be performed upon the object. The terms "class" and "type" are generally used interchangeably in the art but are not entirely synonymous. Object-oriented systems can include "strong typing," wherein type or class conformance is strictly enforced, or "weak typing," wherein conformance is weakly enforced. A strongly-typed system introduces semantic dependencies such that even small changes in a base class interface require recompilation of all subclasses. The related concepts of "static binding" and "dynamic binding" refer to the time when names are bound to types or classes. Static binding means that the types of all variables and expressions are fixed at the time of compilation; dynamic binding means that the types of all variables and expressions are not known until runtime.

The distinction between an object's "class" and its "type" is subtle but important. An object's class defines how the object is implemented. The class defines the object's internal state and the implementation of its operations. In contrast, an object's type only refers to its interface, which is the set of requests to which the object can respond. An object can have many types and objects of different classes can have the same type. Because a class defines the operations that an object can perform, it also defines the object's type. When an object is an instance of a class, it is implied in the art that the object supports the interface defined by the class.

"Polymorphism" represents a concept in type theory in which a single name (such as a variable declaration) may denote objects of many different classes that are related by some common superclass. Any object denoted by this name can therefore respond to some common set of operations. Polymorphism exists when the features of inheritance and dynamic binding interact and is perhaps one of the two most powerful features of object-oriented programming systems.

All well-structured object-oriented system architectures are based on standard patterns for class designs. Reference is made to Erich Gamma et al., (*Design Patterns: Elements of Reusable Object-Oriented Software*, Addison-Wesley Publishing Co., Reading, Mass., 1995) for a description of the important design patterns known in the object-oriented programming arts. Gamma et al. describe a catalog of 23 design patterns for classes suitable for use in object-oriented systems.

According to Gamma et al., class inheritance is fundamentally a mechanism for extending an application's functionality through the reuse of the parent class functionality. Class inheritance permits rapid definition of a new kind of object in terms of an old one, providing new implementations for merely the cost of changes made to an existing class. Class inheritance also supports polymorphism by providing for the definition of families of objects with identical interfaces, usually through inheritance from one base class. When inheritance is used properly, all subclasses derived from a base class must share its interface. This implies that a subclass merely adds or overrides operations and does not hide operations of the parent class. All subclasses may then respond to the requests in the base class interface, making them all subtypes of the base class.

Practitioners in the art recognize that class inheritance has some disadvantages as well. First, there are no means for changing the implementations inherited from parent classes at runtime because inheritance is defined at time of compilation. Second, and more importantly, parent classes often define at least part of their subclasses' physical representation. The implementation of a subclass then becomes so bound up with the parent class implementation that any change in the parent's implementation must force the subclass to change. This exposure of the subclass to the details of its parent's implementation is said in the art to lead to "inheritance breaking encapsulation."

All object-oriented programming systems are characterized by a tension and opposition between the two key features of "encapsulation" and "inheritance." The use of polymorphism increases readability and programmer productivity but may lead to slower software implementations. Accordingly, practitioners in the art strive to balance the mutually inconsistent properties of reusability, extensibility, and polymorphism in object-oriented programming systems to optimize overall system performance.

Implementation dependencies can create problems when attempting to reuse a subclass. Whenever any aspect of the inherited implementation is not appropriate for the new problem domain, the base class must be rewritten or replaced by something more appropriate. This dependency limits flexibility and ultimately reusability. One cure for this is to inherit only from abstract classes because they usually provide little or no implementation. Favoring object composition over class inheritance helps to keep each class encapsulated and focused on a single task. The concept of "delegation" offers a way to make composition as powerful for reuse as inheritance. With delegation, two objects are involved in handling a request: a receiving object delegates operations to its "delegate," with is analogous to subclasses deferring requests to parent classes. Delegation is an extreme example of using object composition to replace inheritance as a mechanism for ensuring code reusability without rewriting existing classes.

Less extremely, application code is often written to contain sets of objects that inherit from an abstract base class so that the application can deal with the different subclasses of the abstract base class through the protocol established by the abstract base class. This allows most of the application to be written without knowledge of the details of the different subclasses or even without knowledge of the existence of the several subclasses. Disadvantageously, even with this strategy, there must always be some code somewhere in the application that actually instantiates the subclasses. Preparation of this code requires knowledge of all of the possible subclasses to permit selection of the proper subclass for instantiation. Accordingly, whenever a new subclass is added to the application, system developers must rewrite at least this portion of the application code to incorporate knowledge of each new subclass as it is added to the system.

This requirement to rewrite existing class code means that the entire application must be recompiled whenever a new subclass is added. This situation, well-known in the art, hampers the flexibility of the application and gives rise to a clearly-felt need in the art for some mechanism that allows addition of new application subclasses of a given base class without modification to any existing application code.

Gamma et al. describes several design patterns that attempt to limit this problem by isolating much of the application from the effects of creating new subclasses but the best of these design patterns merely isolate the main architectural elements of the application and do not eliminate all changes to existing code. For instance, as mentioned above, the application code that lists the subclasses available for instantiation must always be modified by the programmer when adding a subclass. None of the solutions offered by Gamma et al. can eliminate the application's requirement to know which new classes are added to the application. Without an available solution to this well-known problem, practitioners in the art continue to be obliged to incur full application recompilation to add a single new subclass in any application. These unresolved problems and deficiencies are clearly felt in the art and are solved by this invention in the manner described below.

SUMMARY OF THE INVENTION

The procedure of this invention solves the above problem by introducing an intelligent creator design pattern for an abstract class that instantiates a creator subclass for each application subclass of an application base class. Each "intelligent" creator subclass includes methods for "recognizing" the application subclass that it must instantiate. These recognition methods are required only when the application subclass is first instantiated because, after instantiation, each instance maintains its own identity and can be processed accordingly. This "intelligent" creator base class has recognition methods that cooperate with a separate "dynamic" list object having methods for updating a list of the creator and application subclasses to permit instantiation of a new application subclass without modification or recompilation of any existing application code.

An object of this invention is to provide a new "intelligent creator" design pattern that operates to remove from the application all prior knowledge whatsoever of specific application subclasses of a given application base class. Because the application has no knowledge of any specific subclass, a new subclass may be added at any time without modification to the application. Each intelligent creator subclass of this invention includes methods necessary for "recognizing" the application subclass that must be instantiated so that a new application subclass can be instantiated responsive to "recognition" of predetermined input data. An advantage of this invention is that the recognized input data may include user-interface data but need not necessarily do so.

The foregoing, together with other objects, features, and advantages of this invention, can be better appreciated with reference to the following specification, claims, and the accompanying drawing.

BRIEF DESCRIPTION OF THE DRAWINGS

For a more complete understanding of this invention, reference is now made to the following detailed description of the embodiments as illustrated in the accompanying drawing, wherein.

DESCRIPTION OF THE PREFERRED EMBODIMENT

Figure 1:
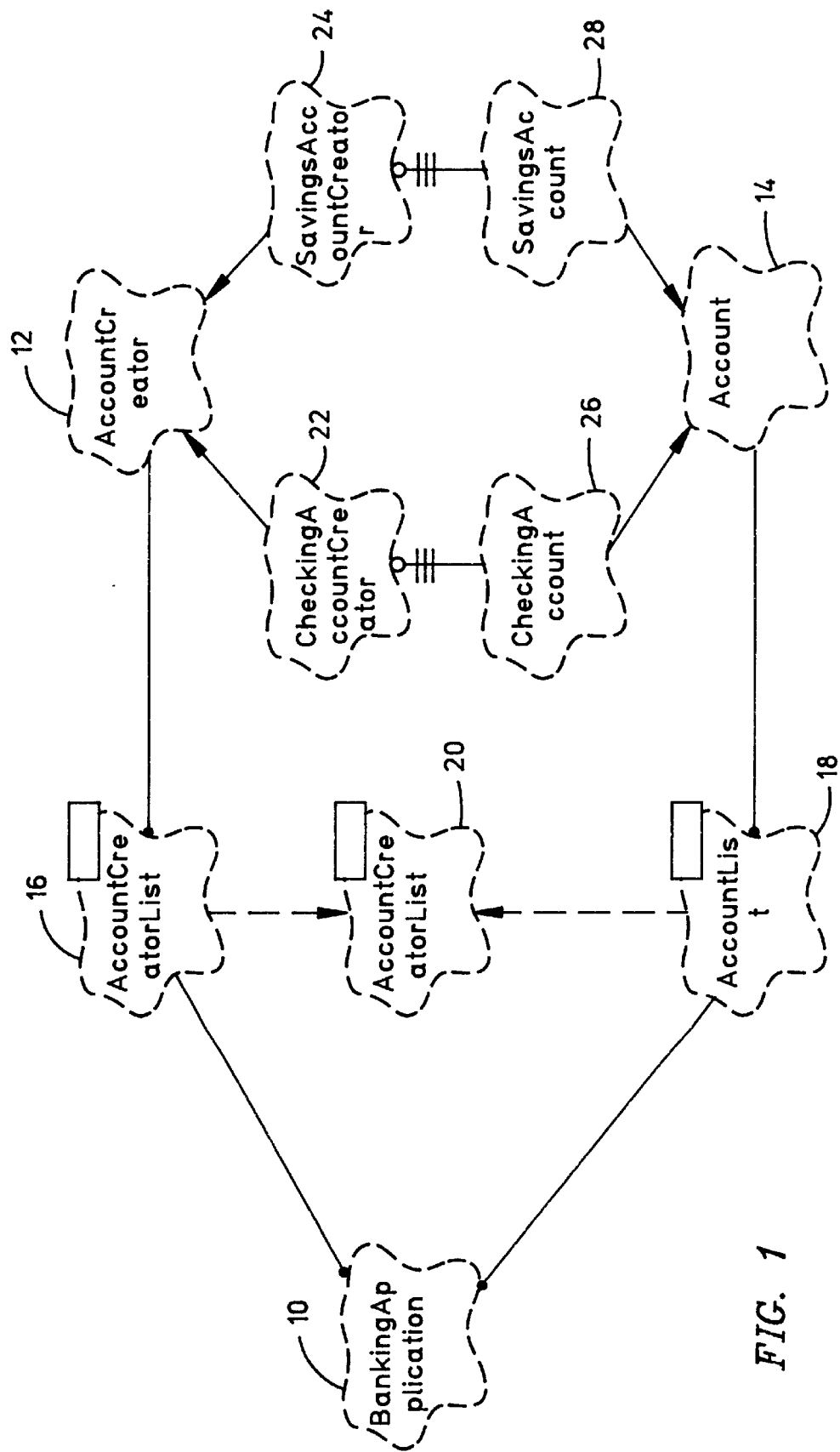
FIG. 1 is a Booch class diagram of a banking application example demonstrating the process of this invention.

The process of this invention arises from the unexpectedly advantageous observation that a creator class used for each of the application subclasses to be instantiated in an application can be equipped with methods for "recognizing" that the particular creator class should be used to create an instance of its designated application subclass. The particular method or methods used for recognizing the need to create a subclass instance may be very specific to the particular application and are demonstrated below in terms of two examples. Using this "intelligent" creator class with "recognizing methods" permits hiding of how instances of the application base class are created and put together so that the application system at large knows only the object interfaces as defined by the abstract application base class. The intelligent creator class uses inheritance to vary the subclass that is to be instantiated so that a new application subclass can be added to the application merely by adding a new creator subclass with the particular implementation details embodied in the new application subclass. These particular details include the particular changes to the abstract "recognizing methods" needed to properly instantiate the new application subclass.

The intelligent creator base class of this invention operates to instantiate subclasses of a given abstract application class that did not exist when the particular abstract application class and the application code that instantiates the subclass was written. That is, a new application subclass can be added to the application without revising any of the existing application code but merely by adding to the application a new creator subclass inheriting from the intelligent creator base class.

Application code is often written to contain sets of objects that are instances of an abstract base class so that the application may deal with the different subclasses of the abstract base class through the protocol established in the abstract base class. This architecture permits the application to be written so that it need know only which subclasses must be instantiated. Until now, because this code must know all of the potential subclasses, developers were forced to rewrite the code whenever a new subclass is added to the application system. The process of this invention solves this problem by adding a "dynamic list object" to the application, which contains list maintenance methods that update the application subclass list in response to the addition to the application of each new intelligent creator subclass. Because the dynamic list object code is "self-maintaining," no code modifications are required when adding a new application subclass. The dynamic list object invokes its maintenance methods to update an internal application subclass list. This means that any number of new subclasses may be added to the application without modifying the dynamic list object code. No other application code changes are required when adding new creator subclasses because the creator subclass interfaces are inherited without modification from a known abstract creator base class. This means that any number of new application subclasses may be added without modification to any part of the existing application code.

These advantages and features may be appreciated with reference to application examples, two of which are now described. FIG. 1 is a Booch class diagram of a banking application example, using notation defined in the above-cited Booch reference. BankingApplication 10 is presumed to include heterogeneous lists of accounts. The application is written so that it knows that a bank contains many "Account" objects without concern for knowing details of the several subclasses of Accounts that might actually be instantiated, such as "CheckingAccount," "SavingsAccount," "IRAAccount," and the like. The Creator subclass for each specific Account subclass includes methods for displaying the special attributes of the particular account subclass that it creates. A banker user then may select the type of new account to be opened (instantiated) by explicitly instructing the appropriate creator subclass to instantiate an object of its designated type. Thus, in this example, "recognition" is accomplished through a user interface by description and feedback without any application knowledge of the creator subclass selection requirement. In FIG. 1, the abstract intelligent creator base class is denominated "AccountCreator" 12. The abstract application base class is denominated "Account" 14.

Banking application 10 also includes a dynamic list object for maintaining a list of the creator subclasses of account creator 12, which is shown in FIG. 1 as AccountCreatorList class 16. AccountCreatorList class 16 is coded to hold the abstract base class of the creators (AccountCreator class 12) so that any new creator subclass can be easily added to the creator list without changing the code that handles the creator list. Thus, when Application 10 receives some input, it tests that input against each of the creators in the list and when one of the creators recognizes the input, the appropriate application subclass is instantiated. Application 10 need not know what the input was, what different types of creators are on the list, or what specific type of subclass is being instantiated. The application need only know that it has a list of objects and a list of creators and that it should go to the list of creators to process any new input. The list of creators is owned by the application, contains only one creator for each subclass that may be instantiated and includes maintenance methods that allow the addition of new creator subclasses to the list.

Using Booch notation, FIG. 1 shows that BankingApplication 10 "has" AccountCreatorList 16, which in turn "has" AccountCreator 12. BankingApplication 10 also has "AccountList" 18, which in turn has Account class 14. The dynamic list object discussed above is shown in FIG. 1 as the AccountCreatorList instance 20. List instance 20 is related by instantiation to both class 16 and class 18, as shown by the notation used in FIG. 1.

AccountCreator 12 is the intelligent creator base class for the CheckingAccountCreator subclass 22 and the SavingsAccountCreator subclass 24. Subclasses 22 and 24 are classes and not objects, so they are shown in FIG. 1 as instances of base class 12, which may be a metaclass but is preferably an abstract class. According to Booch, a "metaclass" is a class whose instances are themselves classes. An "abstract class" is written with the expectation that its concrete subclasses will add to its structure and behavior, typically by implementing its abstract operations. A metaclass is a class whose implementation is complete and thus may have instances, but whose instances are themselves classes. Thus, in FIG. 1, AccountCreator class 12 may be an abstract class whose concrete subclasses 22 and 24 add additional implementations or it may be a metaclass whose instances 22 and 24 are themselves classes. Either strategy is useful for embodying the procedure of this invention, but the use of an abstract base class is preferred to avoid breaking encapsulation.

Similarly, the CheckingAccount subclass 26 and the SavingsAccount subclass 28 are application subclasses of Account class 14, which is an application base class that may be either abstract or a concrete metaclass, but is preferably abstract.

CheckingAccountCreator subclass 22 creates application subclass instances "using" CheckingAccount subclass 26 "for implementation." Subclass 22 is the "client" who depends upon the "supplier" subclass 26 to provide certain services. The "implementation" dependency indicates that operations of the client class 22 invoke operations of the supplier class 26 or have signatures whose return class or arguments are instances of the supplier class 26. Thus, creator subclass 22 invokes application subclass 26 to return an instance of a CheckingAccount. Similarly, SavingsAccountCreator 24 uses SavingsAccount 28 to instantiate a SavingsAccount. Creator subclass 24 has "implementation access" to application subclass 28.

Figure 2:
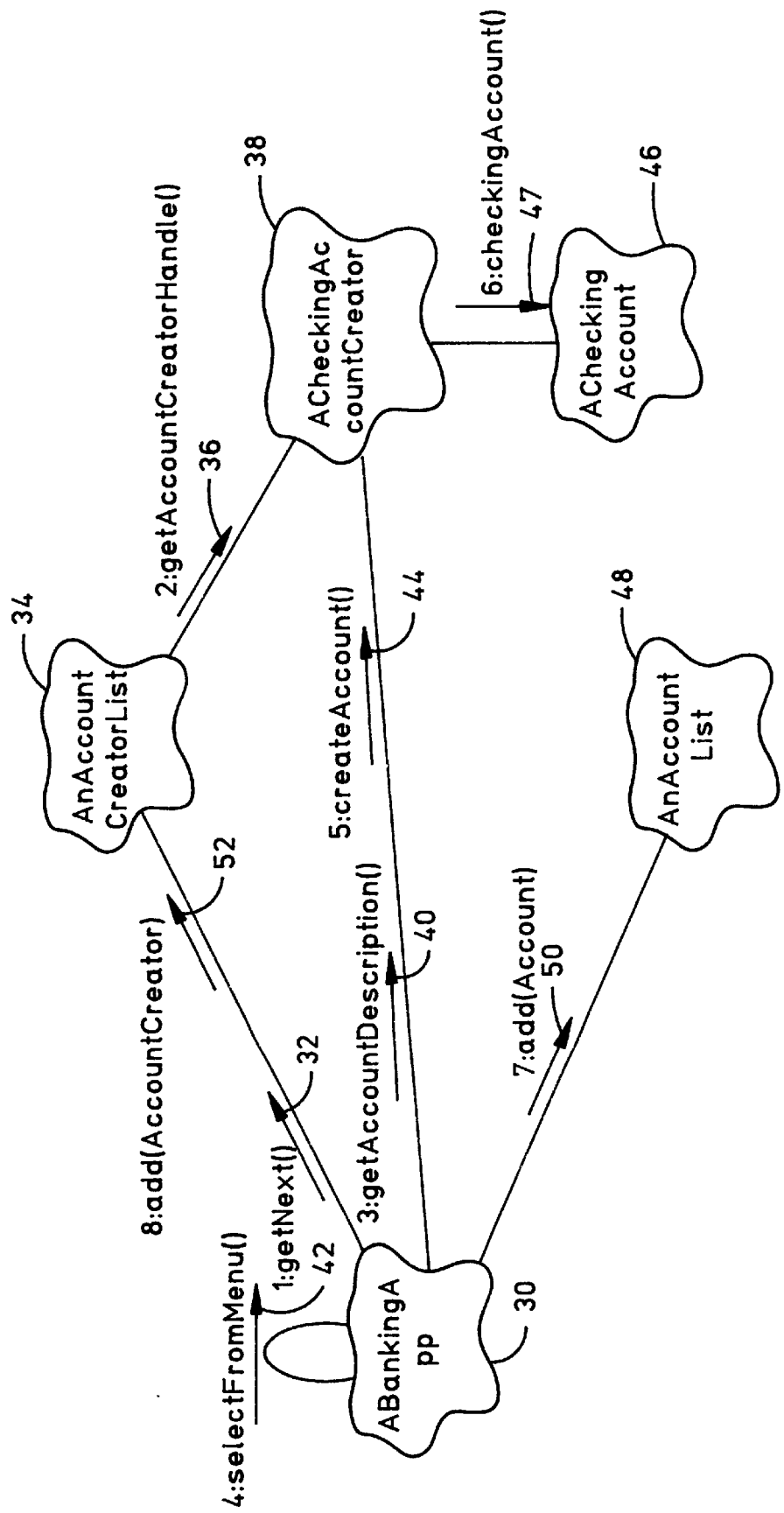
FIG. 2 is a Booch object diagram of the banking application example from FIG. 1.
Figure 3:
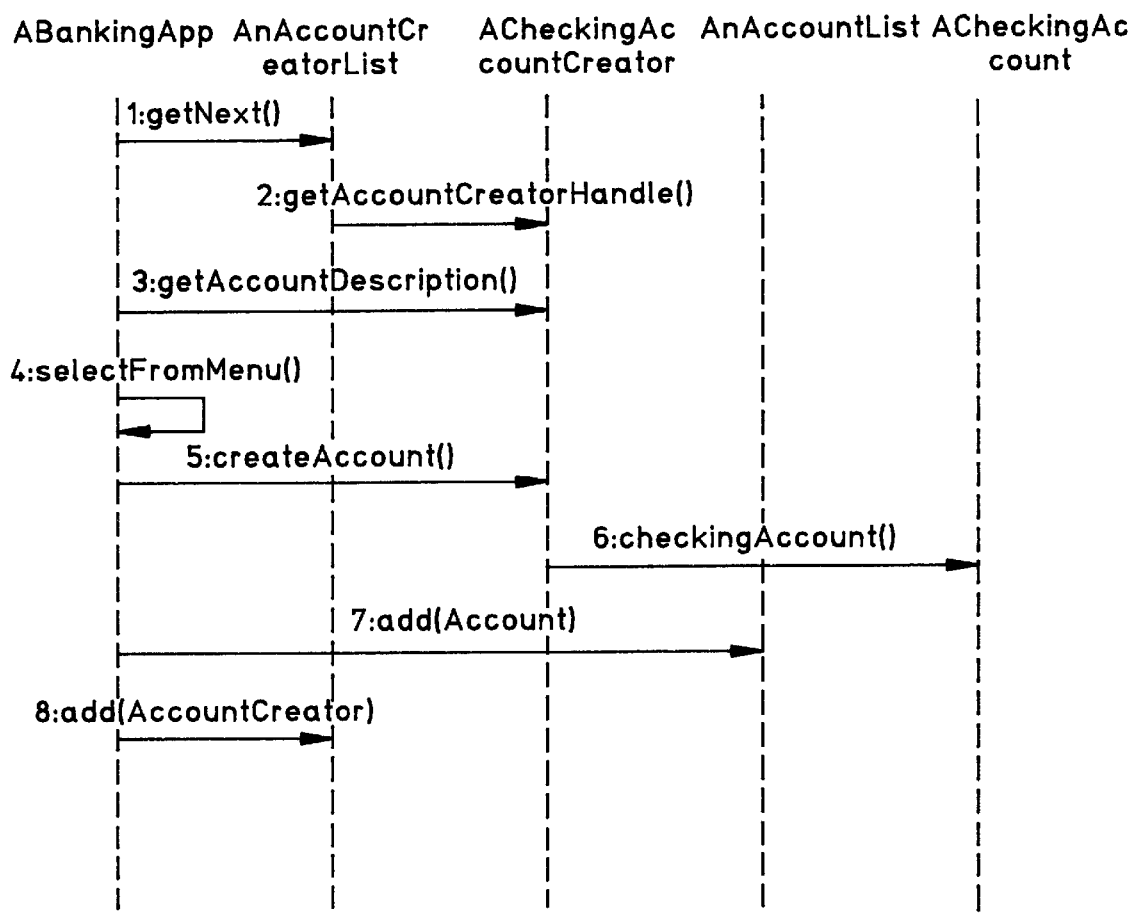
FIG. 3 is a Booch interaction diagram of the banking application example from FIG. 1.

FIG. 2 is a Booch object diagram showing an operation example in terms of the existence of objects and their relationship in the logical view of the banking application example of FIG. 1. FIG. 3 shows a Booch interaction diagram of the operation example from FIG. 2.

The operation example shown in FIGS. 2–3 presumes that a banker wishes to open a new checking account for a client. The banker first perhaps examines a menu of the various account types in the application, including a name and description of each account type. This menu itself is generated by the application, which proceeds to scan the list of creator subclasses, causing each to post the name and description of its related application subclass. The application need not know how many are on the list or anything else about the listed elements because the "AccountCreator" base class 12 includes within its abstract protocol the methods necessary to return a name and description.

FIG. 2 shows a collection of objects linked by the messages transferred between them. For instance, ABankingApp object 30 first sends a getNexto message 32 to AnAccountCreatorList object 34. List object 34 then sends a getAccountCreatorHandle( ) message to ACheckingAccountCreator object 38. After returning a "handle," object 30 sends a getAccountDescription( ) message 40 to creator object 38, which returns the appropriate name and description to the menu. This process loops through list 34 until a "menu" is assembled.

The banker then provides a selectFromMenu( ) message 42 to object 30 by means of a suitable user interface input to object 30. Presuming that the banker selects a "checking account" for the new client, object 30 next sends a CreateAccount( ) message 44 to Creator subclass 38, which responsively instantiates ACheckingAccount object 46 and loads its data by message 47. Application object 30 adds the new checking account 46 to AnAccountList object 48 by means of the add( ) message 50. Finally, object 30 sends an add( ) message 52 to CreatorList object 34 to add ACheckingAccountCreator object 38 to the creator list object 34. Note that the example shown in FIGS. 2–3 uses a checking account creator class to exemplify one of a plurality of different subclasses to an abstract account creator class.

If the bank decides to add "MoneyMarketAccount" to its offering, a new creator subclass for MoneyMarketAccount may be written and added to the system. The application method that accepts new creators is then run and the new MoneyMarketAccount creator is added to the creator list (by means of message 52). Because the application is only concerned with the abstract base class AccountCreator 12 (FIG. 1), it requires no knowledge of the MoneyMarketAccount creator class implementation details. Now when the application goes to CreatorList 34 to assemble and display the account description menu, there is an additional description in the menu, without any revision to the existing application code.

Figure 4:
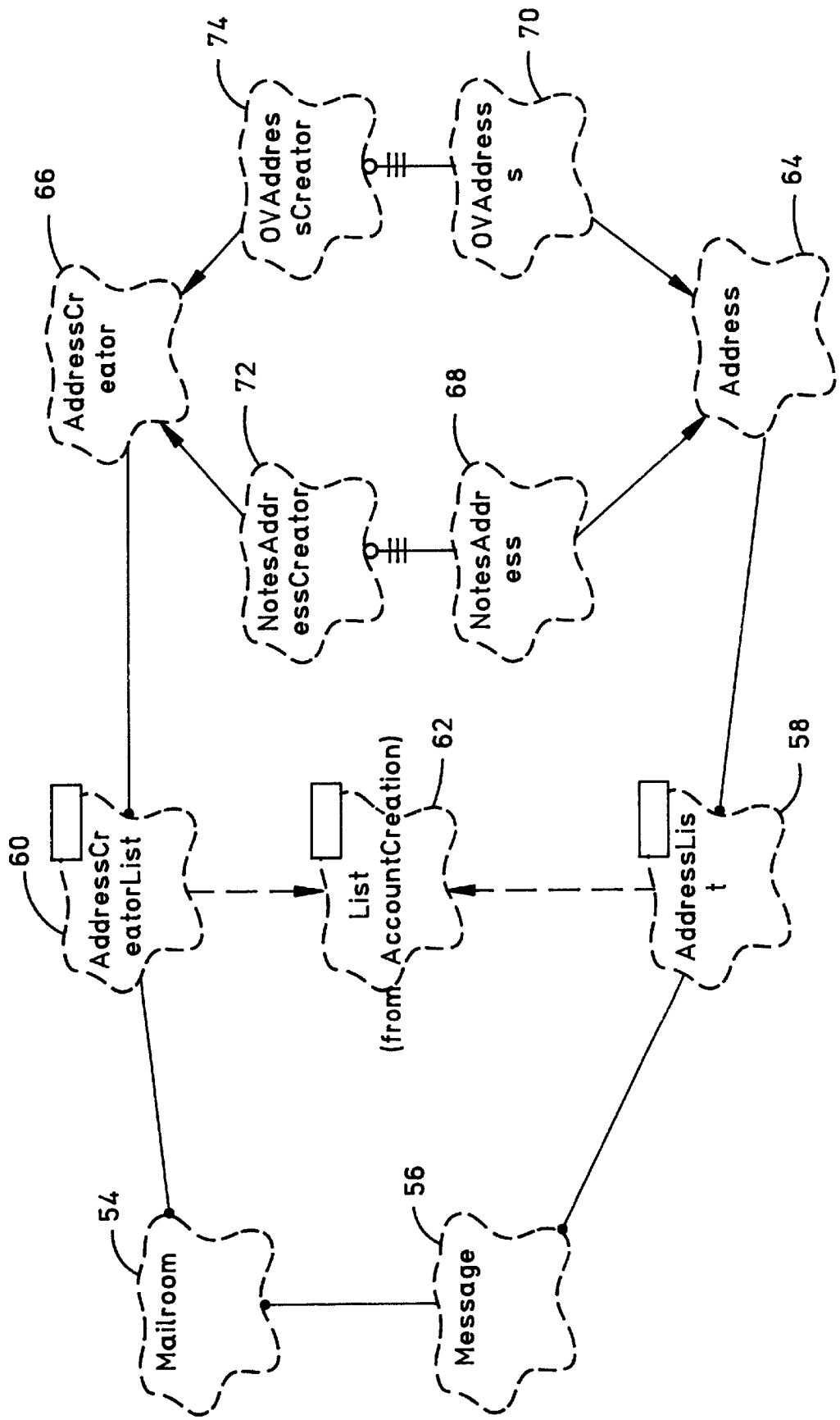
FIG. 4 is a Booch class diagram of an e-mail application example demonstrating the process of this invention.

FIG. 4 shows a Booch class diagram of an e-mail processing application example employing the procedure of this invention. A mailroom application object 54 includes methods for receiving incoming messages. Application 54 has a message class 56 for decomposing incoming messages and distributing the elements thereof. Message class 56 has an Address List class 58 and Mailroom application 54 has an AddressCreatorList class 60. Mailroom application 54 must handle any of the many different kinds of addresses that are valid in the system. When a message arrives off of the network, the message text is analyzed to extract the addresses in the message and these addresses are passed to AddressCreator class 66. Each of the several creator subclasses of class 66 then parses the message in attempting to "recognize" the address format as received in the incoming message. The recognizing creator subclass then instantiates the proper address object and loads it with the message data, placing it in the correct data members for that subclass of message. In this example, "recognition" is accomplished by parsing the address text from the received message. The primary difference between this e-mail application example and the above banking application example is the manner in which the appropriate creator subclass recognizes the necessary instantiation.

In FIG. 4, a dynamic list object 62 is instantiated with reference to both list classes 58 and 60. List class 58 has the abstract Address base class 64 and the creator list class 60 has the abstract AddressCreator base class 66. Address base class 64 is inherited by several application subclasses, exemplified by the NoteAddress subclass 68 and the OVAddress subclass 70. A new application subclass of address base class 64 may be added to accommodate a new e-mail address formats without modifying the existing application code.

Similarly, AddressCreator base class 66 is an intelligent creator class that is inherited by several subclasses, exemplified by NoteAddressCreator subclass 72 and OVAddressCreator subclass 74. Subclass 72 operates to instantiate a new NoteAddress object with access to subclass 68 for the necessary implementation details. Subclass 74 has similar implementation access to subclass 70 when instantiating an OVAddress object. List object 62 includes a list of all creator subclasses exemplified by subclasses 72 and 74 and inherits from class 60 the methods necessary to update this list.

Figure 5:
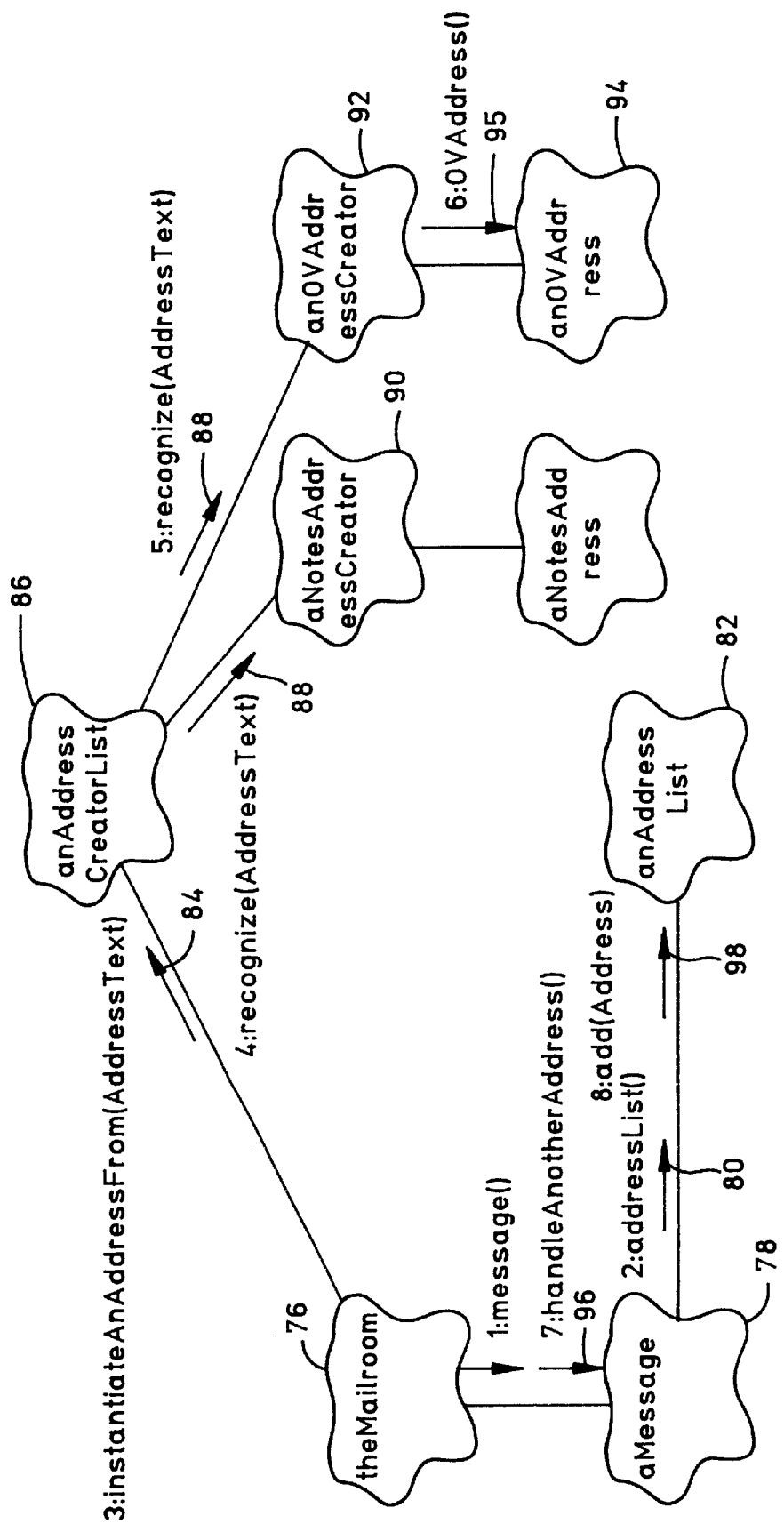
FIG. 5 is a Booch object diagram of the e-mail example from FIG. 4.
Figure 6:
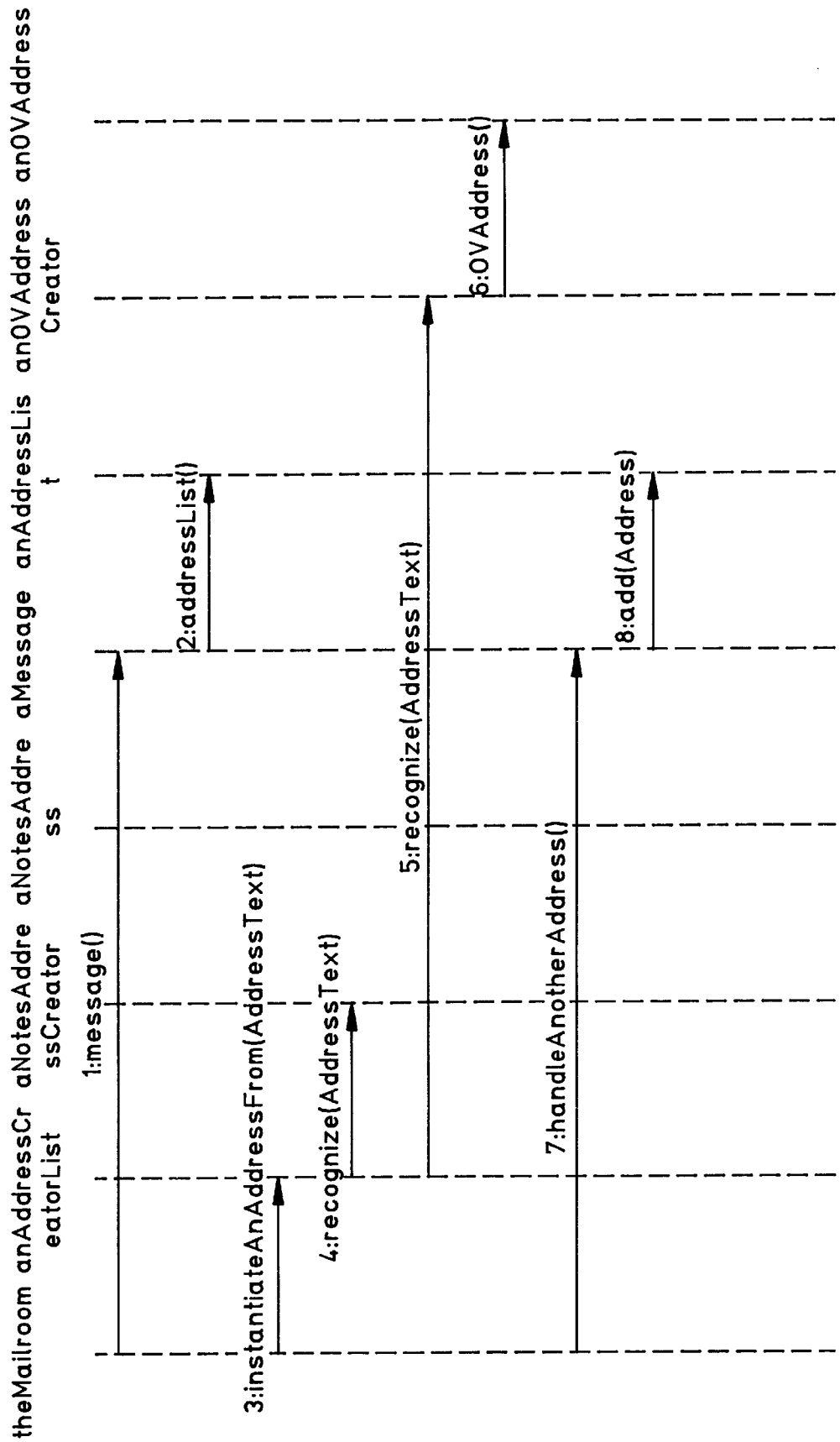
FIG. 6 is a Booch interaction diagram of the e-mail example from FIG. 4.

FIG. 5 shows a Booch object diagram for an operation example of the e-mail mailroom application example from FIG. 4. FIG. 6 shows a Booch interaction diagram for the operation example from FIG. 5. The mailroom object 76 receives an e-mail message and sends it to the message object 78. Message object 78 parses the message and extracts the address list, sending it in a message 80 to anAddressList object 82. Mailroom object 76 next sends a message 84 to anAddressCreatorList object 86 requesting instantiation of an address object responsive to the incoming message. List object 86 steps through all of the creator subclasses, sending a recognize(AddressText) message 88 to each one in turn asking for "recognition" of the address type. In the example in FIG. 5, two exemplary creator objects are shown; a NotesAddressCreator object 90 and an OVAddressCreator object 92. When one of these several creator objects recognizes the AddressText message 88, it immediately and responsively instantiates the necessary address object. In FIG. 5, OVAddress creator object 92 recognizes the address text as an OVAddress, instantiates an OVAddress 94, and passes the OVAddress to the new object 94 in message 95. Mailroom object 76 then passes a handleAnotherAddress( ) message 96 to message object 78, which then sends an add(Address) message 98 to AddressList object 82.

Adding an "InternetAddress" creator subclass (for example) inheriting from class 86 to this application leads to the updating of list object 82 responsive to the first arrival of an "InternetAddress" e-mail message according to this procedure. Such arrival also leads to instantiation of the "InternetAddress" object inheriting from class 64 of FIG. 4, without revision to any application code.

Figure 7:
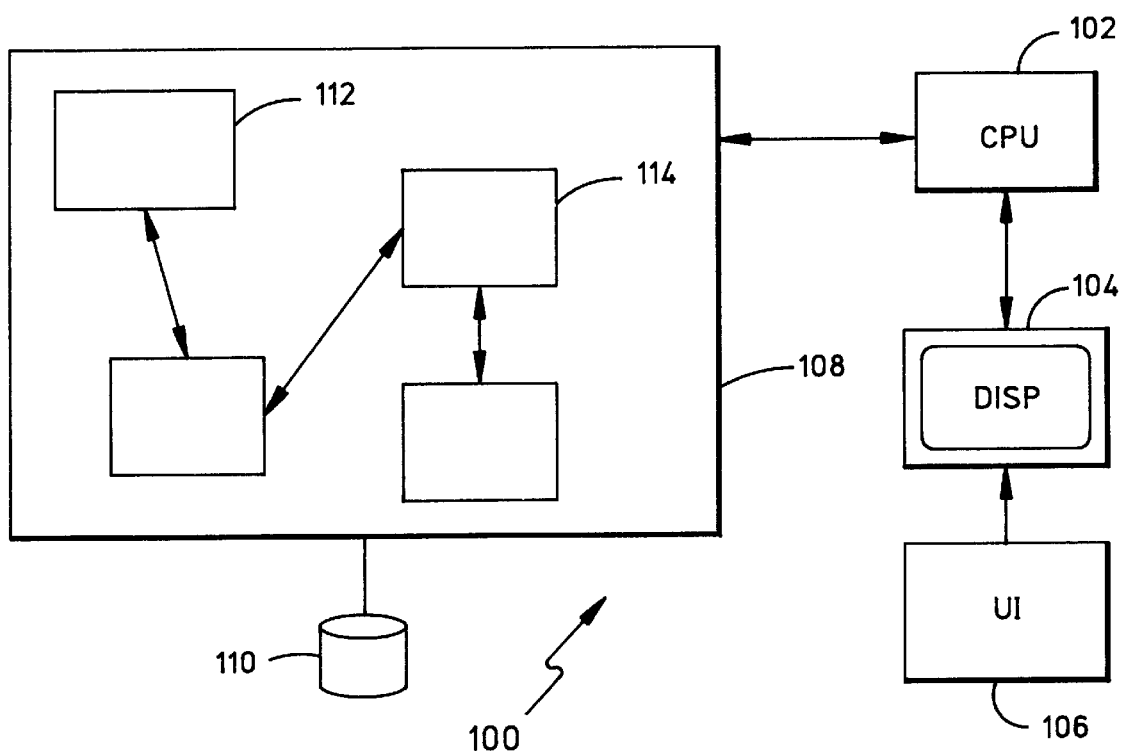
FIG. 7 is a functional block diagram of a data processing system embodiment according to this invention.
Figure 8:
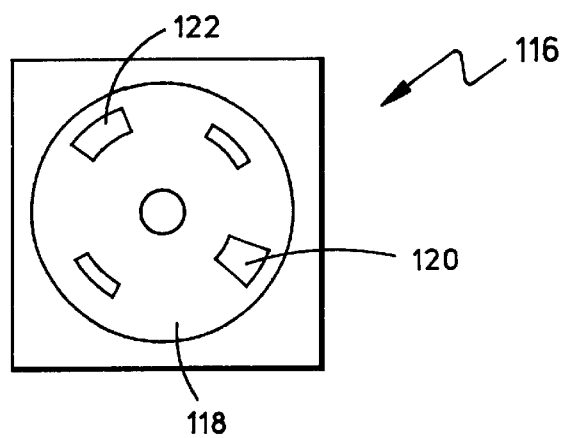
FIG. 8 show a computer program product embodiment according to this invention.

While this invention is primarily described as a procedure, it can be understood by a person of ordinary skill in the art that an apparatus, such as the conventional data processor 100 shown in FIG. 7, which includes a CPU 102, a display 104, a user interface (UI) 106, and data storage means including a memory 108 and a persistent store 110, could be programmed or otherwise designed to facilitate the practice of the method of this invention. Data processing system 100 might include program means for executing the procedure of this invention, such as the program objects exemplified by program objects 112 and 114 stored in memory 108. Also, an article of manufacture, such as the pre-recorded floppy disk 116 shown in FIG. 8, could include a storage medium 118 and program means recorded thereon for directing data processing system 100 to facilitate the practice of the method of this invention. Such program means might for example include program means 120 for implementing the dynamic list object of this invention and program means 122 for implementing the intelligent creator base class methods of this invention. It can be readily understood by any practitioner skilled in the art that such apparatus and articles of manufacture also fall within the spirit and scope of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A machine-executed procedure for instantiating a new application subclass of an application base class without revising existing application code in an object-oriented programming system (OOPS) application that includes at least one said application base class and one or more creator subclasses of at least one creator base class, each said creator subclass having methods for recognizing a predetermined application input and for instantiating an application subclass of said application base class, said procedure comprising the steps of:

(a) adding to said OOPS application a new said creator subclass having methods for recognizing a new said predetermined application input and for instantiating said new application subclass of an unknown type;

(b) updating a dynamic list object having methods for maintaining a list of references to said creator subclasses by executing said list maintaining methods to add a reference to said new creator subclass;

(c) receiving an application input at said OOPS application;

(d) executing said recognizing methods in said creator subclasses referenced in said creator list object until said new creator subclass recognizes said received application input as conforming to said new predetermined application input; and (e) executing said new creator subclass instantiating methods to create an instance of said new application subclass responsive to said input recognition.

2. The procedure of claim 1 wherein:

said OOPS application includes user interface means for accepting data from a user; and said application input includes user-interface data received from said user interface means.

3. An object-oriented programming system (OOPS) having at least one application comprising:

an application base class;

one or more creator subclasses of a creator base class, each said creator subclass having methods for recognizing a predetermined application input and methods for instantiating an application subclass of said application base class; and a dynamic list object having methods for maintaining a list of references to said creator subclasses including a method for adding to said list a new said creator subclass having methods for recognizing a new said predetermined application input and for instantiating a new said application subclass of said application base class.

4. The OOPS of claim 3 further comprising:

user interface means for accepting data from a user, wherein said application input includes user-interface data received from said user interface means.

5. A computer program product for use in a computer system including an object-oriented programming system (OOPS) that supports execution of at least one OOPS application, the computer program product comprising:

a recording medium;

an OOPS application that includes at least one application base class and one or more creator subclasses of at least one creator base class, each said creator subclass having methods for recognizing a predetermined application input and for instantiating an unknown-type application subclass of said application base class;

means recorded on said recording medium for directing said computer system to add to said OOPS application a new said creator subclass having methods for recognizing a new said predetermined application input and for instantiating said new application subclass;

means recorded on said recording medium for directing said computer system to update a dynamic list object having methods for maintaining a list of references to said creator subclasses by executing said list maintaining methods to add a reference to said new creator subclass;

means recorded on said recording medium for directing said computer system to receive an application input at said OOPS application;

means recorded on said recording medium for directing said computer system to execute said recognizing methods in said creator subclasses referenced in said creator list object until said new creator subclass recognizes said received application input as conforming to said new predetermined application input; and means recorded on said recording medium for directing said computer system to execute said new creator subclass instantiating methods to create an instance of said new application subclass responsive to said input recognition, thereby instantiating the new application subclass of an application base class without revising existing application code.

6. The computer program product of claim 5 wherein:

said computer system includes user interface means for accepting data from a user; and said application input includes user-interface data received from said user interface means.

7. A data processing system comprising:

data store means for storing data and program instructions;

data processor means coupled to said data store means for executing said program instructions;

an object-oriented programming system (OOPS) application stored in said data store means;

at least one application base class and one or more creator subclasses of at least one creator base class within said OOPS application, each said creator subclass having methods for recognizing a predetermined application input and for instantiating an application subclass of said application base class;

expander means in said data store means for adding to said OOPS application a new said creator subclass having methods for recognizing a new said predetermined application input and for instantiating said new application subclass of unknown type;

a dynamic list object within said OOPS application, said list object having methods for maintaining a list of references to said creator subclasses by executing said list maintaining methods to add a reference to said new creator subclass;

input means coupled to said data processor means for receiving an application input at said OOPS application;

evaluator means coupled to said input means for executing said recognizing methods in said creator subclasses referenced in said creator list object until said new creator subclass recognizes said received application input as conforming to said new predetermined application input; and launcher means coupled to said evaluator means for executing said new creator subclass instantiating methods to create an instance of said new application subclass responsive to said input recognition, thereby instantiating the new application subclass of said application base class without revising existing application code.

8. The data processing system of claim 7 further comprising:

user interface means coupled to said data processor means for accepting data from a user, wherein said application input includes user-interface data received from said user interface means.

9. A system for creating application subclasses in an object oriented programming system (OOPS) application comprising:

means for recognizing a predetermined application input that calls for instantiation of an unknown-type application subclass of an application base class of the OOPS application; and means responsive to the recognition of said predetermined application input for instantiating an application subclass of an application base class in said OOPS application, thereby instantiating the new application subclass of said application base class without revising the existing application code.

10. The system of claim 9 further comprising:

said OOPS application including user interface means for accepting data from a user; and said application input including user interface data received from said user interface means.

11. A machine executed procedure for creating application subclasses in an object oriented programming system (OOPS) application, the method comprising steps of:

recognizing a predetermined application input that calls for instantiation of an unknown-type application subclass of an application base class of the OOPS application; and responsive to the recognition of said predetermined application input, instantiating the application subclass of an application base class in said OOPS application, thereby instantiating the new application subclass of the application base class without revising existing application code.

12. The procedure of claim 11 wherein:

said OOPS application includes user interface means for accepting data from a user; and said application input includes user interface data received from said user interface means.

13. A computer program product for use with a computer system, including an object oriented programming system (OOPS) application and application subclasses, said computer program product comprising:

a recording medium;

means recorded on said recording medium for recognizing a predetermined OOPS application input that calls for instantiation of an unknown-type application subclass of an application base class of the OOPS application; and means recorded on said recording medium for responding to the recognition of said predetermined OOPS application input and for instantiating an application subclass of an application base class in said OOPS application, thereby instantiating the new application subclass of said application base class without revising existing application code.

14. The computer program product of claim 13 wherein:

said computer system includes user interface means for accepting data from a user; and said application input includes user interface data received from said user interface means.

* * * * *